(12) United States Patent
Takeuchi et al.

(10) Patent No.: US 6,552,992 B2
(45) Date of Patent: Apr. 22, 2003

(54) AUTOMATIC BALANCING MECHANISM FOR DISK DRIVER FREE FROM VIBRATIONS DUE TO CHARACTERISTIC ANGULAR VELOCITY

(76) Inventors: Makoto Takeuchi, c/o NEC Home Electronics, Ltd., 4-24, Shiromi 1-chome, Chuo-ku, Osaka-shi, Osaka (JP); Kazuhiko Kitamura, c/o NEC Home Electronics, Ltd., 4-24, Shiromi 1-chome, Chuo-ku, Osaka-shi, Osaka (JP)

( * ) Notice: Subject to any disclaimer, the term of this patent is extended or adjusted under 35 U.S.C. 154(b) by 0 days.

(21) Appl. No.: 09/793,165

(22) Filed: Feb. 26, 2001

(65) Prior Publication Data

US 2001/0008515 A1 Jul. 19, 2001

Related U.S. Application Data

(62) Division of application No. 09/017,753, filed on Feb. 3, 1998, now Pat. No. 6,295,269.

(30) Foreign Application Priority Data

Feb. 3, 1997 (JP) ................................................. 9-34357

(51) Int. Cl.$^7$ .............................................. G11B 19/20
(52) U.S. Cl. .................................. 369/264; 360/99.08
(58) Field of Search ................................. 369/263, 264, 369/266; 360/98.07, 99.04, 99.08; 310/67 R; 73/460, 573

(56) References Cited

U.S. PATENT DOCUMENTS

| | | | | | |
|---|---|---|---|---|---|
| 2,659,243 | A | * | 11/1953 | Darrieus | 74/573 R |
| 3,109,321 | A | * | 11/1963 | Rogers | 74/573 R |
| 3,203,273 | A | * | 8/1965 | Favrot | 74/573 R |
| 3,970,260 | A | * | 7/1976 | Bruggisser et al. | 242/485.9 |
| 4,060,009 | A | * | 11/1977 | Wyman | 74/573 R |
| 4,075,909 | A | * | 2/1978 | Deakin | 74/573 R |
| 5,111,713 | A | * | 5/1992 | Cameron et al. | 74/573 R |
| 5,256,037 | A | * | 10/1993 | Chatelain | 417/423 |
| 5,391,952 | A | * | 2/1995 | Simazu et al. | 310/51 |
| 6,373,154 | B1 | * | 4/2002 | Sohn et al. | 310/51 |
| 6,388,981 | B1 | * | 5/2002 | Sohn et al. | 360/99.08 |

FOREIGN PATENT DOCUMENTS

| | | | |
|---|---|---|---|
| JP | 62-24052 | * | 2/1987 |
| JP | 62-135743 | * | 6/1987 |
| JP | 2-139758 | * | 5/1990 |
| JP | 3-86968 | * | 4/1991 |

* cited by examiner

Primary Examiner—David Davis
(74) Attorney, Agent, or Firm—Scully, Scott, Murphy & Presser

(57) ABSTRACT

A weight member is attached to a rotor so as to forcibly offset a center of gravity of a rotor from a rotating axis, centrifugal force moves two movable weight members to appropriate positions for canceling the unbalance due to the center of gravity offset from the rotating axis, and stoppers restrict the movement of the two movable weight members in a sectoral area opposite to the center of gravity so that the rotor is free from vibrations due to the characteristic angular velocity.

5 Claims, 18 Drawing Sheets

AUTOMATIC BALANCING MECHANISM FOR DISK DRIVER FREE FROM VIBRATIONS DUE TO CHARACTERISTIC ANGULAR VELOCITY

CROSS REFERENCE TO RELATED APPLICATION

The present application is a divisional of Ser. No. 09/017,753, now U.S. Pat. No. 6,295,269, filed Feb. 3, 1998.

FIELD OF THE INVENTION

This invention relates to an automatic balancing mechanism and, more particularly, to an automatic balancing mechanism for a disk driver free from vibrations due to a characteristic angular velocity of a rotor.

DESCRIPTION OF THE RELATED ART

A driving mechanism is, by way of example, incorporated in an optical disk memory system, and an optical disk is driven for rotation by the driving mechanism.

A typical example of the disk driving mechanism is illustrated in FIG. 1 of the drawings. An electric motor 1 has a rotor 2, and the rotor 2 is rotated around an axis 3 of rotation. A turn table 4 is fixed to the rotor 2, and is driven for rotation by the electric motor 1. A pulley 5 is movable in the direction of axis 3, and magnetic force or elastic force of a spring is exerted on the pulley 5, and presses an optical disk 6 against the turn table 4. While the rotor 2 is turning around the axis 3, the turn table 4, the pulley 5 and the optical disk 6 turn around the axis 3 together with the rotor 2. Thus, the turn table 4, the pulley 5 and the optical disk 6 turn together, and assume to have a center of gravity. If the center of gravity is aligned with the axis 3, any unbalance does not take place, and the turn table 4, the pulley 5 and the optical disk 6 are stable during the rotation. However, the turn table 4, the pulley 5 and the optical disk 6 are assembled and disassembled at every usage, and it is impossible to make the center of gravity aligned with the axis 3 at all times. Thus, the unbalance is unavoidable, and is causative of vibrations during high-speed rotation. The magnitude of vibrations is dependent on the amount of unbalance and the rotating speed. The distance between the axis 3 and the center of gravity and the weight of the assembly 4/5/6 affect the amount of unbalance.

The disk driving mechanism has been designed to rotate the disk at relatively low speed, and the centrifugal force due to the unbalance is relatively small. Even though the optical disk 6 vibrates due to the unbalance of the assembly 4/5/6, a data read-out head (not shown) exactly reads out data bits from the optical disk. For this reason, any anti-vibration means is not provided for the prior art disk driving mechanism.

Data access speed is getting faster and faster, and a constant linear velocity disk driving mechanism drives the optical disk at 6000 rpm during a data access to an inside area. When the optical disk is driven for rotation at more than 4000 rpm, the vibrations due to the unbalance becomes serious, and the read-out head falls into an error in the data read-out. Thus, a suitable anti-vibration means is required for the high-speed disk driving mechanism.

An automatic balancing mechanism is well known in the field of mechanical dynamics. For example, an automatic balancing mechanism is introduced in the book entitled as "Mechanical Dynamics", and FIG. 2 illustrates the automatic balancing mechanism. A circular groove 10 is formed in a disk 11 integral with a rotor, and two balls 12/13 are movable along the circular groove 10. When the disk 11 is driven for rotation, the centrifugal force F is exerted on each ball 12/13, and is given by equation 1.

$$F = m r \omega^2 \qquad \text{Equation 1}$$

Where m is the mass of the ball 12/13, r is the radius of curvature of the circular groove and $\omega$ is the angular velocity. The component force F1 in X direction and the component force F2 in Y direction are expressed by equations 2 and 3.

$$F1 = m r \omega^2 \sin \alpha \qquad \text{Equation 2}$$

$$F2 = m r \omega^2 \cos \alpha \qquad \text{Equation 3}$$

where $\alpha$ is the angle between X-axis and the line drawn between the ball 12/13 and the center S of the disk 11. If the center of gravity G of the rotor is deviated from the center S of the disk 11 by distance $e$, unbalance takes place, and the centrifugal force F3 due to the unbalance is given by equation 4.

$$F3 = M e \omega^2 \qquad \text{Equation 4}$$

where M is the mass of the rotor. If the centrifugal forces F are balanced with the centrifugal force F3, the balance in Y-direction is expressed as $$F1 + (-F1) = 0 \qquad \text{Equation 5}$$

The component force F1 exerted on the ball 12 cancels the component force F1 exerted on the other ball 13. On the other hand, the component forces F2 exerted on the balls 12/13 are balanced with force F3, and the balance in X-direction is expressed as $$m r \omega^2 \cos \alpha = M e \omega^2 \qquad \text{Equation 6}$$

Therefore, the balls 12/12 are positioned at certain positions satisfying equation 6.

When the automatic balancing mechanism 11/12/13 is simply used for the prior art disk driving mechanism 1/4/5/6 incorporated in the optical data storage system, serious vibrations suddenly take place in the assembly 4/5/6. The serious vibrations are derived from the characteristic angular velocity as follows. FIGS. 3A and 3B illustrate two kinds of relative relation between the center of gravity G and the balls 12/13. Point "O" is indicative of the center of bearings supporting the rotor, and the component force N in the normal direction and the component force T of the tangential direction form the centrifugal force F.

If the angular velocity $\omega$ is less than the characteristic angular velocity $\omega 0$, the center of gravity G is on the same side as the balls 12/13 with respect to the center S as shown in FIG. 3A. In this situation, the component forces N are balanced with the reaction from the disk 11, and the component forces T make the balls 12/13 closer to each other. Then, the unbalance takes place, and is increased together with the positions of the balls 12/13.

On the other hand, if the angular velocity $\omega$ is greater than the characteristic angular velocity $\omega 0$, the center of gravity G is on the line between the center S and the center O as shown in FIG. 3B. In this situation, the component forces N are also balanced with the reaction from the disk 11, and the component forces T cause the balls 12/13 to place at the appropriate positions shown in FIG. 2. Then, the center S is coincident with the center O, and the component forces T are decreased to zero.

When the electric motor 1 is energized, the electric motor 1 increases the angular velocity ω, and the angular velocity ω exceeds over the characteristic angular velocity ω0. While the electric motor 1 is increasing the angular velocity ω under the characteristic angular velocity ω0, the automatic balancing mechanism 11/12/13 and the prior art disk driving mechanism 1/4/5/6/ are established in the relative relation shown in FIG. 3A, and the serious vibrations take place. Even after the angular velocity ω exceeds over the characteristic angular velocity ω0, there is a possibility to move the balls 12/13 from the positions shown in FIG. 3B to the positions shown in FIG. 3A, and the movement causes the serious vibrations to take place.

SUMMARY OF THE INVENTION

It is therefore an important object of the present invention to provide an automatic balancing mechanism which prevents a driving mechanism from vibrations due to the characteristic angular velocity.

To accomplish the object, the present invention proposes to forcibly locate the center of gravity at a certain point opposite to movable weight members.

In accordance with one aspect of the present invention, there is provided an automatic balancing mechanism associated with a rotor driven for rotation around a rotating axis comprising a first weight means associated with the rotor so as to make a center of gravity offset from the rotating axis of the rotor, a stopper means stationary with respect to the rotor and defining a first moving path on the opposite side to the first weight means and the center of gravity with respect to a virtual line perpendicular to the rotating axis, and a plurality of second weight means equal in number to a multiple of two and moved to respective balancing positions on the first moving path due to centrifugal force exerted thereon during a rotation of the rotor so as to cancel unbalance due to the center of gravity.

BRIEF DESCRIPTION OF THE DRAWINGS

The features and advantages of the automatic balancing mechanism will be more clearly understood from the following description taken in conjunction with the accompanying drawings in which.

DESCRIPTION OF THE PREFERRED EMBODIMENTS

First Embodiment

Figure 4:
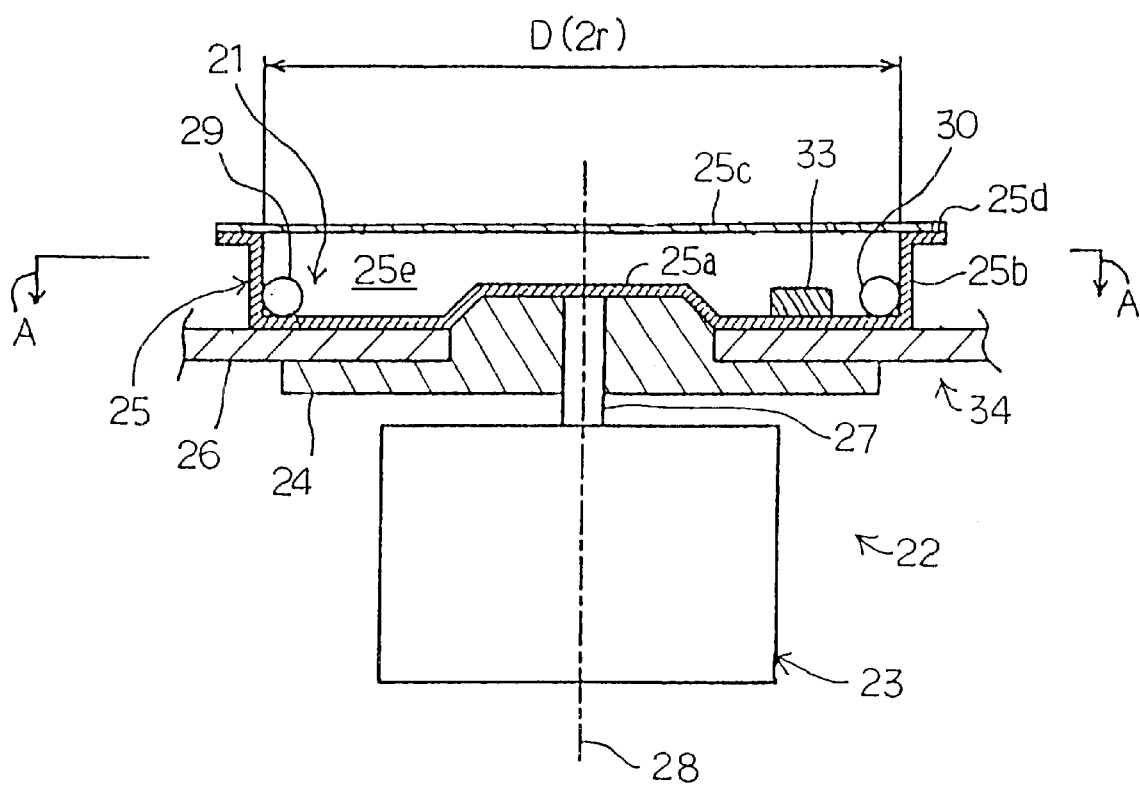
FIG. 4 is a cross sectional view showing a disk driving mechanism equipped with an automatic balancing mechanism according to the present invention.

Referring to FIG. 4 of the drawings, an automatic balancing mechanism 21 embodying the present invention is installed in a disk driving mechanism 22 incorporated in an optical data storage system. The disk driving mechanism 22 is similar to the prior art disk driving mechanism, and includes an electric motor 23, a turn table 24 and a pulley 25 for pressing an optical disk 36 against the turn table 24. The electric motor 23 has an armature 27 rotatable around a center axis 28, and the turn table 24 is fixed to the armature 27. The pulley 25 is movable in the direction of the center axis 28. When the pulley 25 is spaced from the turn table 24, the optical disk 26 is put on the turn table 24, and magnetic force or elastic force urges the pulley 25 toward the turn table 24 so as to fix the optical disk 24 between the turn table 24 and the pulley 25.

The pulley 25 has a circular bottom portion 25a, a side wall portion 25b and an upper lid 25c. The circular bottom portion 25a has a rear surface conformal to the upper surface of the optical disk 26 mounted on the turn table 24, and the side wall portion 25b projects from the periphery of the bottom portion 25a. The upper lid 25c is attached to the upper peripheral surface 25d of the side wall portion 25b, and the circular bottom portion 25a, the side wall portion 25b and the upper lid 25c define an inner space 25e. The inner space 25e has a diameter D=2r.

Figure 5:
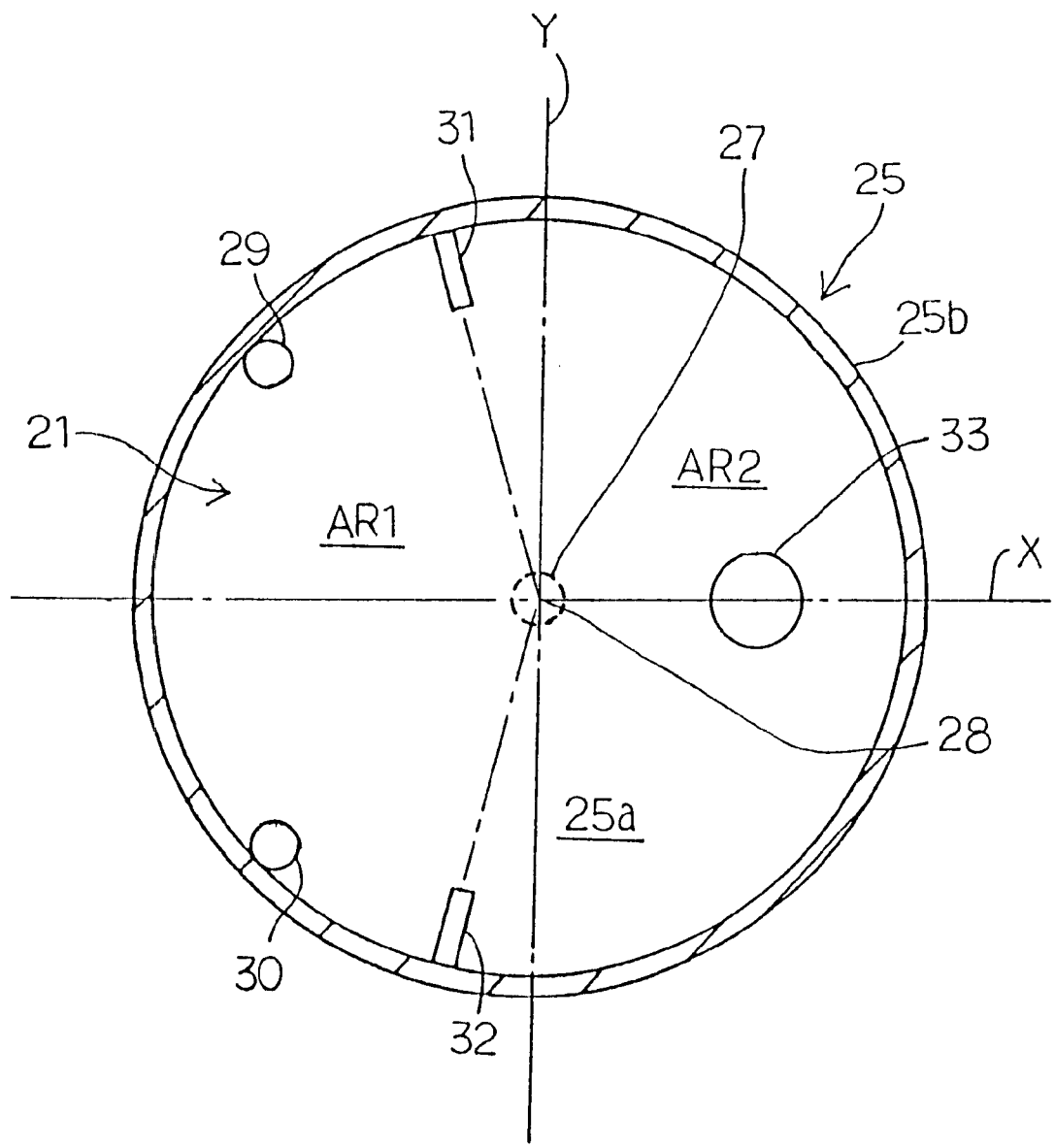
FIG. 5 is a view taken along line 5—5 of FIG. 4 and showing the automatic balancing mechanism.

Turning to FIG. 5 of the drawings, the automatic balancing mechanism 21 includes two balls 29/30 accommodated in the inner space 25e and two stoppers inwardly projecting from the side wall portion 25b and a weight member 33 fixed to the bottom portion 25a. While the turn table 25 is turning around the center axis 28, centrifugal force is exerted on the balls 29/30, and the balls 29/30 roll along the inner surface of the side wall portion 25b. However, the stoppers 31/32 restrict the rolling motion of the ball 29/30, and the balls 29/30 are allowed to roll between the stoppers 31 and 32. Thus, the stoppers 31/32 and the center line 28 defines a sectoral area AR1 for the balls 29/30 on the bottom portion 25a, and the weight member 33 is located in the remaining area AR2 on the bottom portion 25a. In this instance, a part of the side wall portion 25b along the arc of the sectoral area AR1 serves as a guide means, and the armature 27, the turn table 24, the pulley 25, the optical disk 26 and the weight member 33 as a whole constitute an eccentric rotor 34. The upper lid 25c confines the balls 29/30 in the inner space 25e.

Even if unbalance takes place in the assembly 24/25/26, the weight member 33 causes the center of gravity G0 (see FIG. 6A) of the eccentric 34 to be on the opposite side to the balls 29/30, and falls in the certain range indicated by angle θ 0.

The automatic balancing mechanism 21 behaves as follows. While the electric motor 23 is rotating the eccentric rotor 34 together with the balls 29/30, centrifugal forces F' and F" are exerted on the balls 29/30, and are expressed by equation 7.

$$F'=F''=mr\,\omega^2 \qquad \text{Equation 7}$$

where m is the mass of the ball 29/30, ω is the rotational speed of the balls 29/30 and r is the radius of curvature of the inner space 25e. The weight member 33 is assumed to be on X-axis, and Y-axis is perpendicular to X-axis at the origin S on the center line 28. The component forces F1' and F1" in the direction of Y-axis are given by equation 8 and 9.

$$F1'=mr\,\omega^2 \sin\alpha' \qquad \text{Equation 8}$$

$$F1''=mr\,\omega^2 \sin\alpha'' \qquad \text{Equation 9}$$

where α' is the angle between the line from the ball 29 to the origin S and X-axis and α" is the angle between the line from the ball 30 to the origin S and X-axis. The component forces F2' and F2" in the direction of X-axis are given by equations 10 and 11.

$$F1'=mr\,\omega^2 \cos\alpha' \qquad \text{Equation 10}$$

$$F1''=mr\,\omega^2 \cos\alpha'' \qquad \text{Equation 11}$$

On the other hand, centrifugal force F3' is exerted on the weight member 33.

$$F3'=M'\,e'\,\omega^2 \qquad \text{Equation 12}$$

where M' is the mass of the weight member 33 and e' is the distance between the origin S and the center of gravity G' of the weight member 33. Centrifugal force F3r is exerted on the rotor 34, and the component force F3r' in X-axis of the centrifugal force F3 and the component force F3r" in Y-axis are expressed as $$F3r'=Me\omega^2 \cos\beta \qquad \text{Equation 13}$$

$$F3r''=Me\omega^2 \sin\beta \qquad \text{Equation 14}$$

where M is the mass of the rotor 34, e is the distance between the origin S and the center of gravity G of the rotor 34 and β is the angle between the line from the origin S to the center of gravity G and X-axis. Equations 15 and 16 represent the balance in X-axis and the balance in Y-axis.

$$mr\,\omega^2 \cos\alpha' + mr\,\omega^2 \cos\alpha'' = M'\,e'\,\omega^2 + Me\omega^2 \cos\beta \qquad \text{Equation 15}$$

$$mr\,\omega^2 \sin\alpha' + mr\,\omega^2 \sin\alpha'' + Me\omega^2 \sin\beta = 0 \qquad \text{Equation 16}$$

Figure 6A:
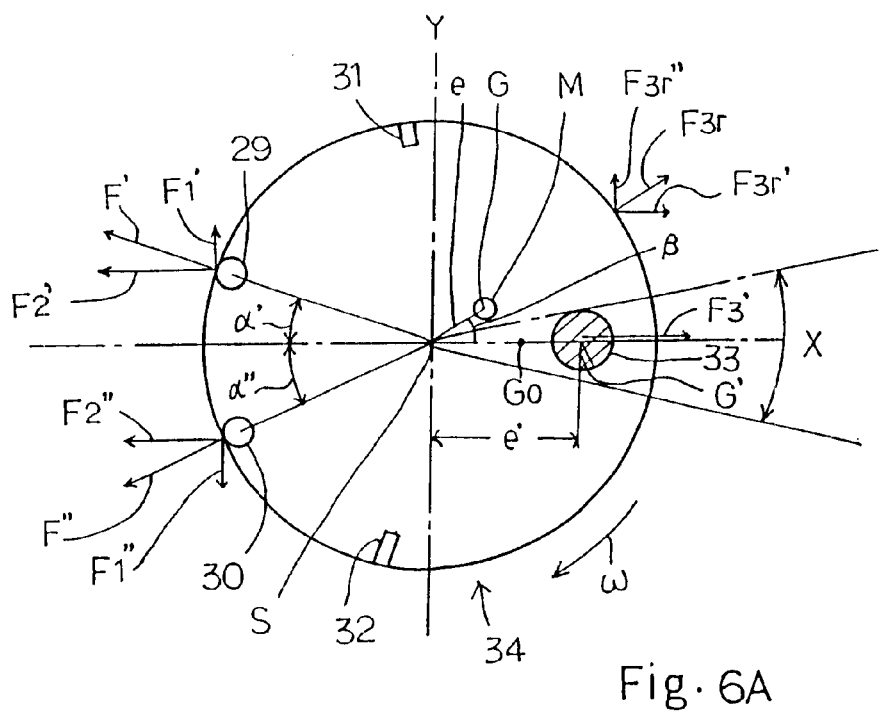
FIGS. 6A and 6B are views showing centrifugal forces exerted on balls and a rotor.
Figure 6B:
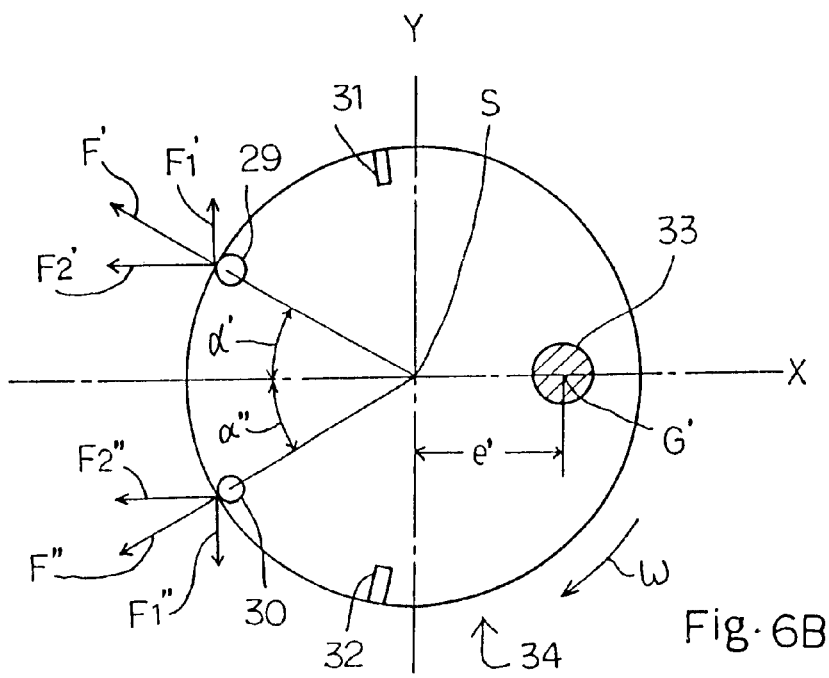

When the balls 29/30 are at positions satisfying α' α" in equations 15 ad 16, the unbalance is decreased to zero. For this reason, even if the center of gravity G is deviated from the center axis 28, the balls 29/30 are moved to the positions satisfying α' α" in equations 15 and 16 and the center of gravity G is matched with the origin S as shown in FIG. 6A. If the unbalance Me is much smaller than the unbalance M'e', the centrifugal force Meω² is negligible, and FIG. 6A is simplified to FIG. 6B. Angle α' is equal to angle α", and the unbalance is decreased to zero at angle α satisfying equation 17.

$$mr\,\omega^2 \cos\alpha' = M'\,e'\,\omega^2 \qquad \text{Equation 17}$$

Figure 1:
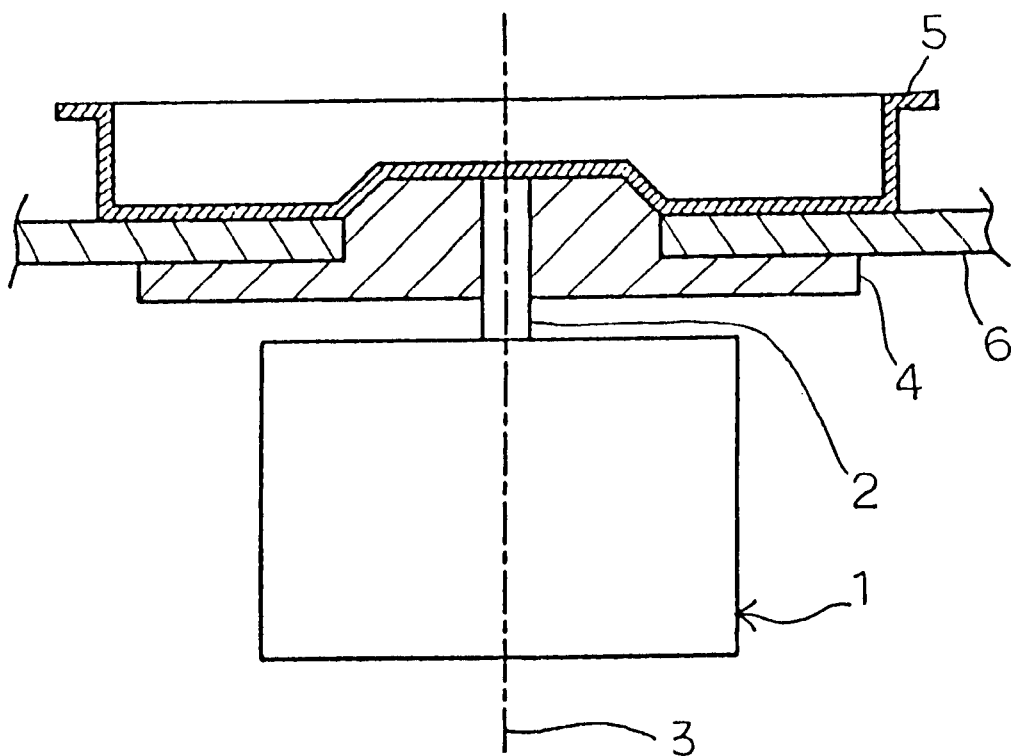
FIG. 1 is a cross sectional view showing the structure of the prior art disk driving mechanism incorporated in the optical data storage system.
Figure 2:
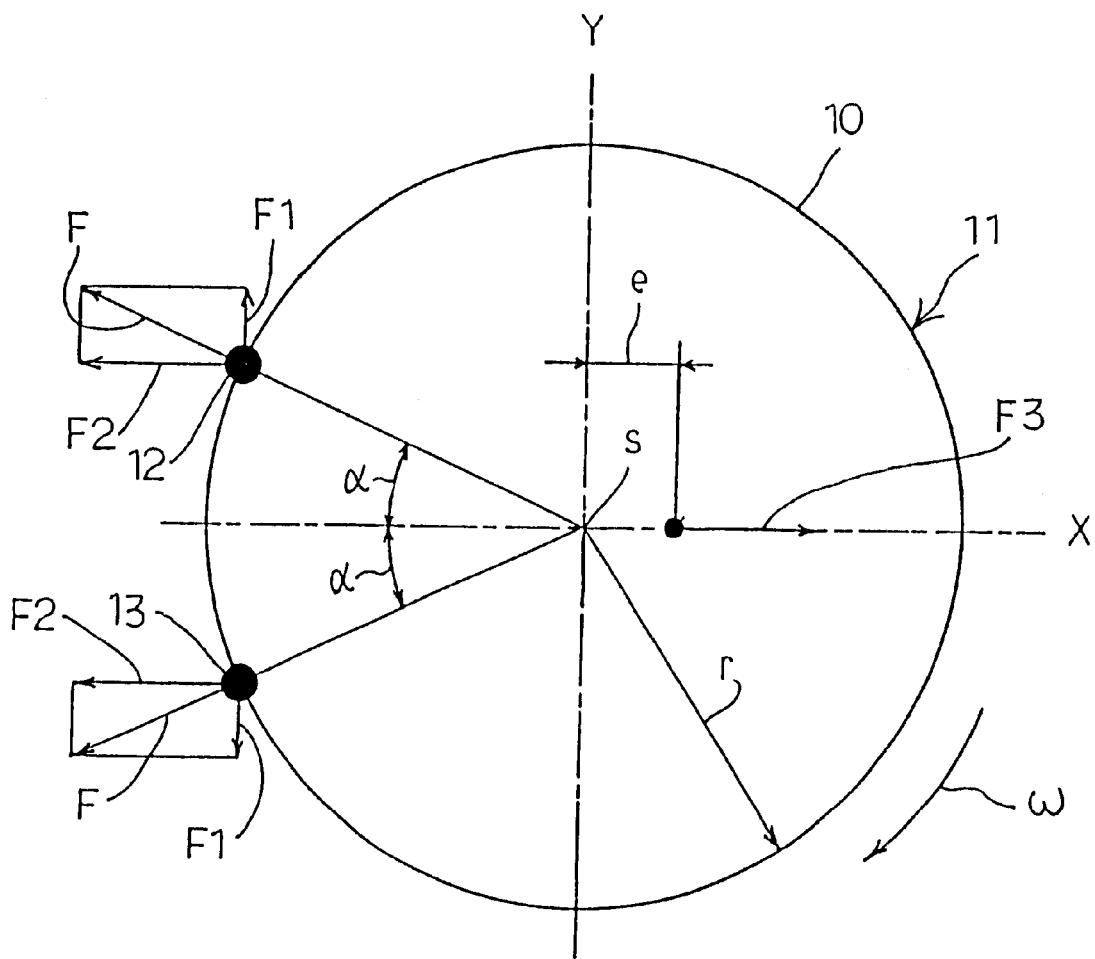
FIG. 2 is a schematic plane view showing the automatic balancing mechanism disclosed in the book entitled as "Mechanical Dynamics"
Figure 3A:
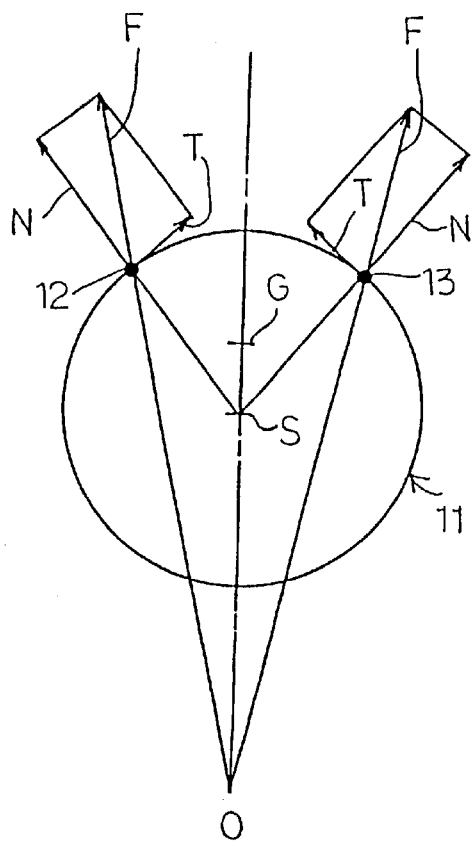
FIGS. 3A and 3B are views showing the two kinds of relative relation between the balls and the center of gravity.

The mass m of the balls 29/30, the mass M' of the weight member 33, the diameter and so forth are regulated in such a manner that the characteristic angular velocity ω0 is less than the velocity ω or the rotational speed of the rotor 34. The sectoral area AR1 is on the opposite side to the weight member 33 with respect to Y-axis, and the stoppers 31/32 do not allow the balls 29/30 to enter into the same side as the weight member 33. For this reason, the balls 29/30 and the center of gravity G do not enter into the relation shown in FIG. 3A, and the automatic balancing mechanism 21 is free from the serious vibrations due to the characteristic angular velocity ω0.

Figure 7A:
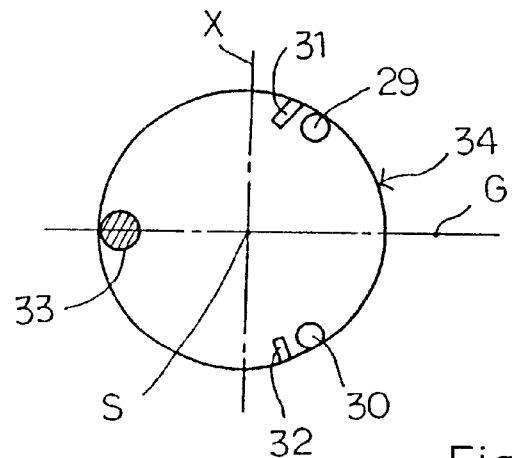
FIGS. 7A to 7C are views showing influence of relation between a weight member and a center of gravity on the motion of the balls.
Figure 7B:
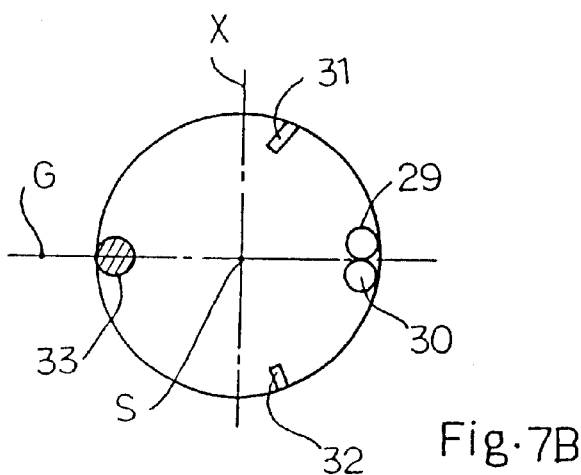
Figure 7C:
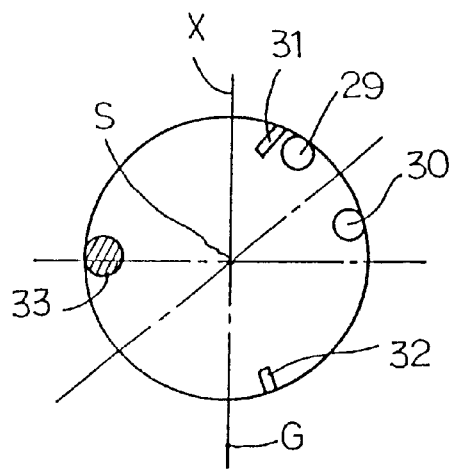

If the center of gravity G is on the opposite side to the weight member 33 with respect to X-axis, the balls 29 and 30 are spaced from each other, and make the rotor 34 balanced as shown in FIG. 7A. On the other hand, if the center of gravity G is on the same side as the weight member 33, the balls 29/30 becomes closer to each other, and make the rotor 34 balanced as shown in FIG. 7B. Finally, if the line between the weight member 33 and the origin S is at right angles to the line between the origin S and the center of gravity G, the balls 29/30 become closer to one of the stoppers 31/32 as shown in FIG. 7C.

In this instance, X-axis serves as a virtual line perpendicular to the center line 28. The weight member 33 and the balls 29/30 serve as a first weight means and a plurality of second weight means, respectively.

As will be understood from the foregoing description, the stoppers 31/32 make the balls 29/30 positioned on the opposite side to the weight member 33, and the automatic balancing mechanism 21 according to the present invention balances the rotor 34 without any serious vibrations due to the characteristic angular velocity.

Second Embodiment

Figure 8:
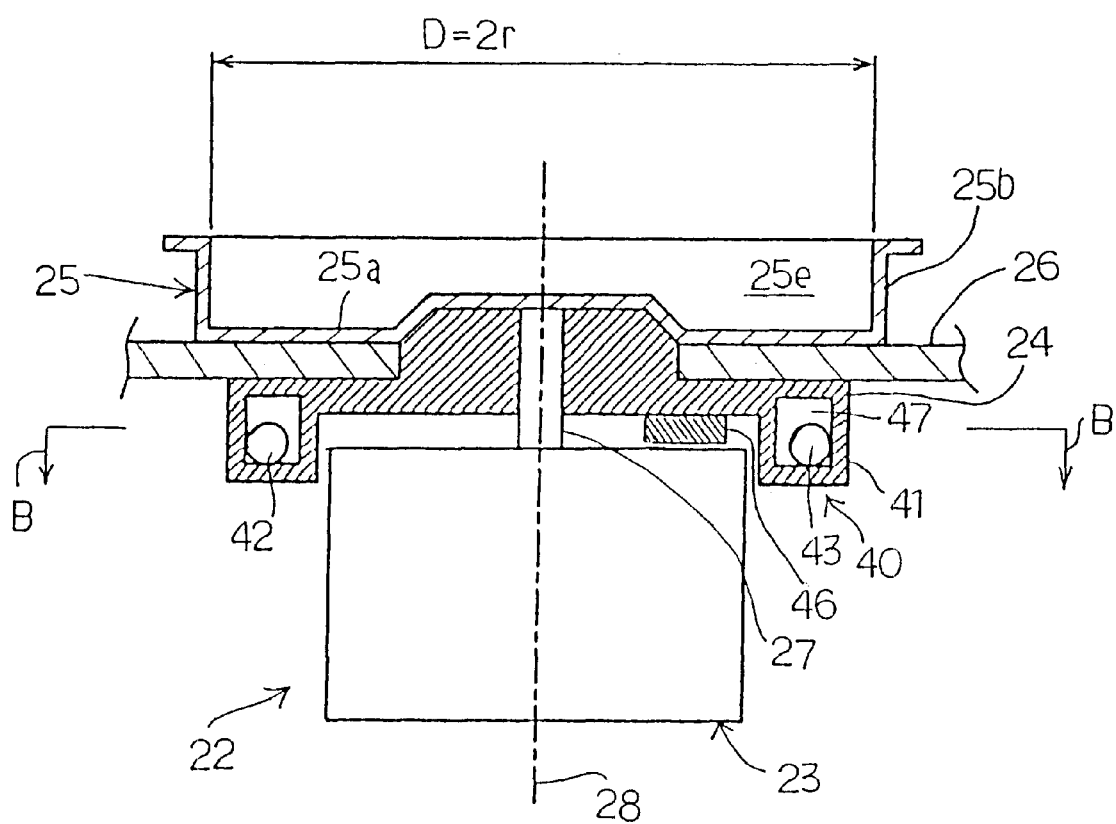
FIG. 8 is a cross sectional view showing another automatic balancing mechanism according to the present invention.
Figure 9:
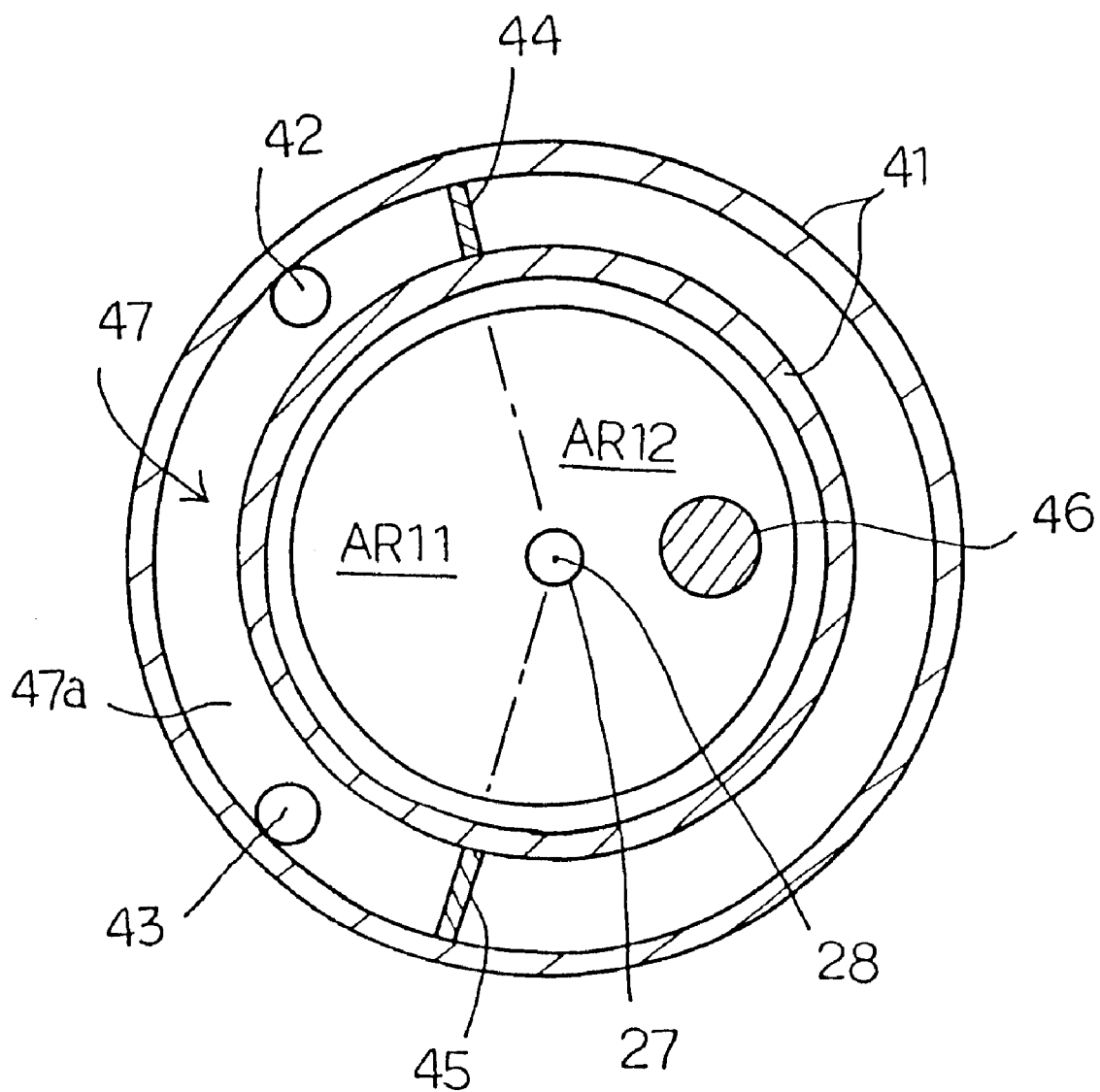
FIG. 9 is a plane view taken along line 9 of FIG. 8 and showing the automatic balancing mechanism.

FIGS. 8 and 9 illustrate another automatic balancing mechanism 40 embodying the present invention. The automatic balancing mechanism 40 is provided for the disk driving mechanism 22, and is integral with the turn table 24. Any ball is not confined in the inner space 25e, and the inner space 25e is open.

The automatic balancing mechanism 40 includes a rim member 41, two balls 42/43, stoppers 44/45 and a weight member 46, and the rim member 41 forms a circular conduit 47 together with the turn table 24. The two balls 42/43 are confined in the circular conduit 47, and are movable in the circular conduit 47. When lines are drawn between the stoppers 44/45 and the center axis 28, the bottom portion 25a is divided into a minor sector AR1 and a major sector AR2, and the balls 42/43 are movable in a part 47a of the circular conduit 47. The stoppers 44/45 set a limit on the movement of the balls 42/43, and do not allow the balls 42/43 into the remaining part of the circular conduit 47. The weight member 46 is fixed to the major sector AR12, and is opposite to the balls 42/43 with respect to a virtual line passing through the center axis 28.

The balls 42/43, the stoppers 44/45 and the weight member 46 achieves all the advantages of the first embodiment.

Third Embodiment

Figure 10:
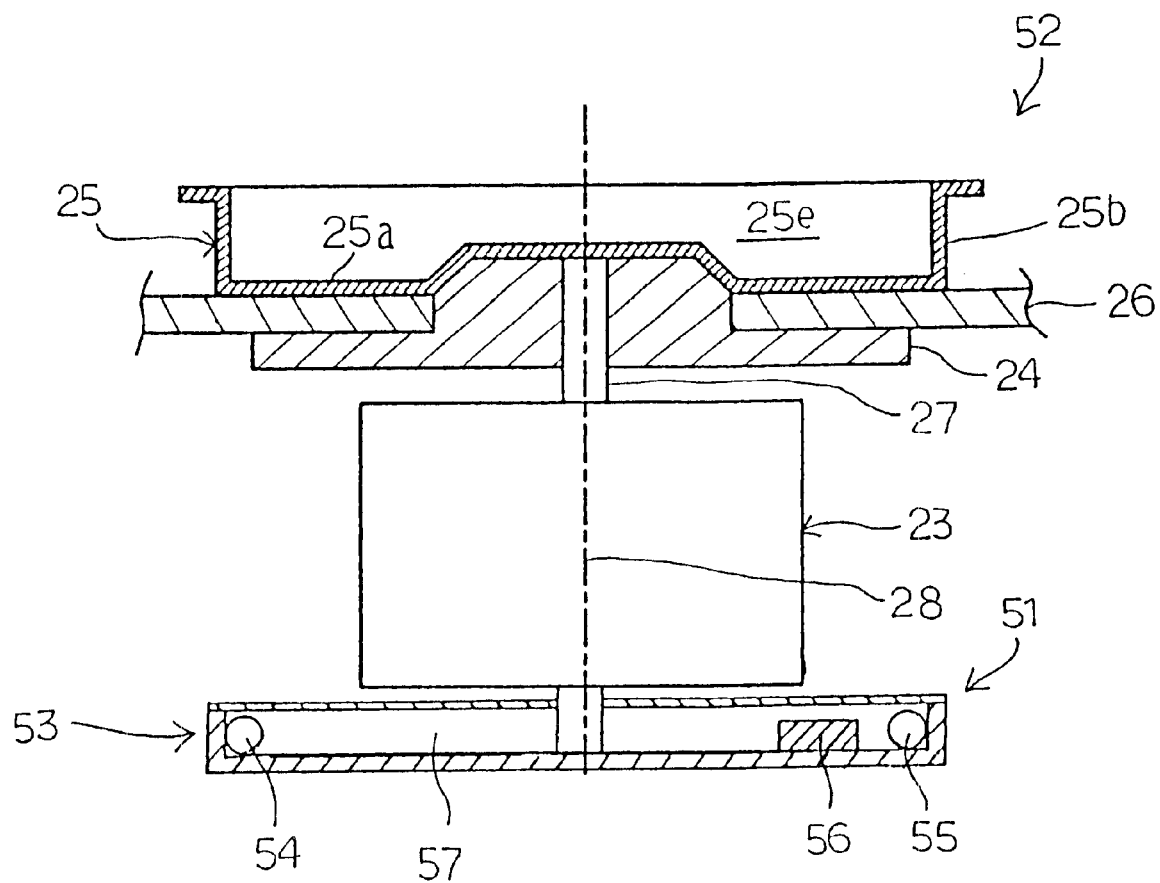
FIG. 10 is a cross sectional view showing yet another automatic balancing mechanism according to the present invention.

FIG. 10 illustrates yet another automatic balancing mechanism 51 embodying the present invention. The automatic balancing mechanism 51 is provided for a disk driving mechanism 52 similar to the driving mechanism 22, and component parts of the automatic balancing mechanism 51 are labeled with the same references designating corresponding parts shown in FIG. 4.

In this instance, the armature 27 projects from both of the upper and lower surfaces of the electric motor 23, and the automatic balancing mechanism 51 is attached to the armature 27 projecting from the lower surface.

The automatic balancing mechanism 51 includes a disk 53, balls 54/55, a weight member 56 and stoppers (not shown). A circular inner space 57 is formed in the disk 53, and the balls 54/55, the weight member 56 and the stoppers are arranged in the circular inner space 57 as similar to those of the above described embodiments. For this reason, the advantages of the embodiments are also achieved by the automatic balancing mechanism 51 implementing the third embodiment.

Fourth Embodiment

Figure 11:
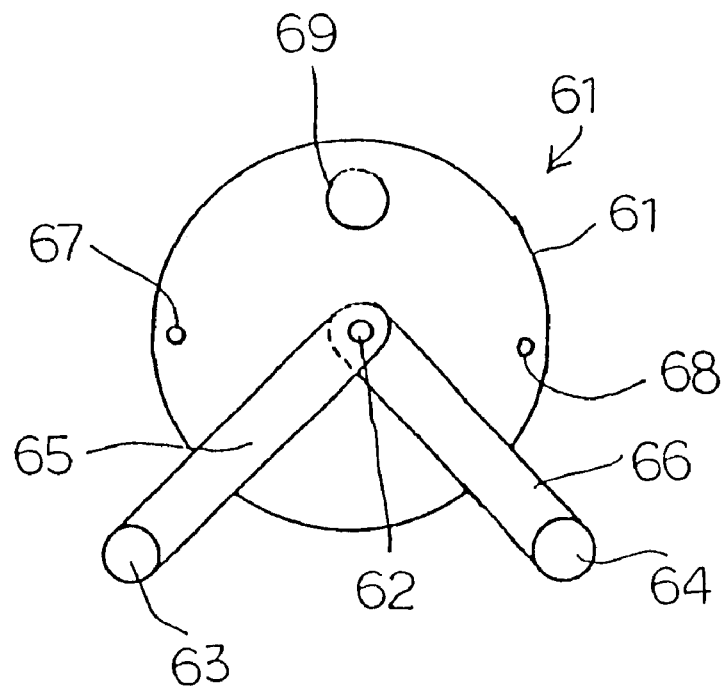
FIG. 11 is a plane view showing the arrangement of still another automatic balancing mechanism according to the present invention.
Figure 12:
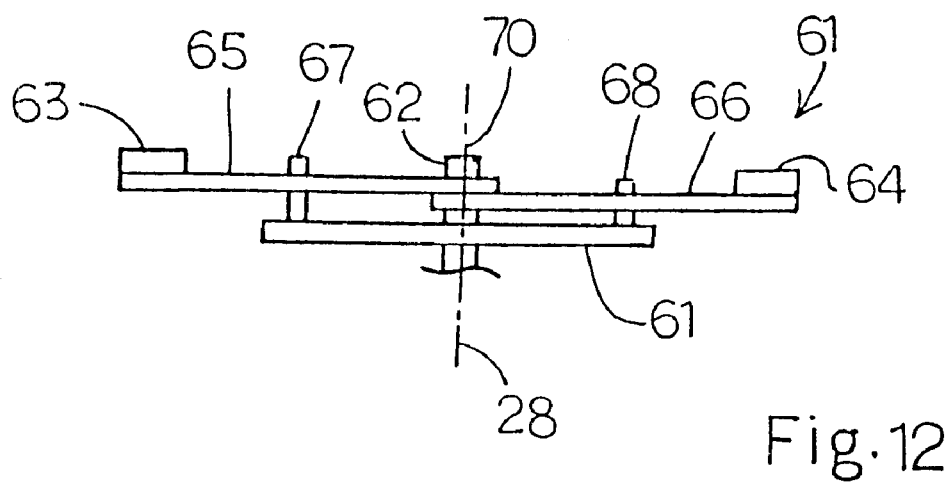
FIG. 12 is a side view showing the automatic balancing mechanism shown in FIG. 11.

FIGS. 11 and 12 illustrate still another automatic balancing mechanism embodying the present invention. The automatic balancing mechanism 61 includes a disk member 61, a stationary center pin 62, two weight members 63/64, two arm members 65/66, stopper pins 67/68 and a stationary weight member 69. The disk member 61 is driven for rotation together with the rotor 34, and has a center axis 70 substantially aligned with the center axis 28. The stationary center pin 62 project from the disk member 61, and is aligned with the center axis 70. The two weight members 63/64 are fixed to the arm members 65/66, and the arm members 65/66 are rotatably supported by the center pin 62. For this reason, the weight members 63/64 are rotatable around the center axis 70 together with the arm members 65/66. The stopper pins 67/68 project from the disk member 61, and the arm members 65/66 do not exceed over the stopper pins 67/68. For this reason, the weight members 63/64 and the arm members 65/66 are turnable between the stopper pins 67 and 68. The stationary weight member 69 is fixed to the disk member 61 outside the trajectories of the arm members 65/66, and the arm members 65/66 are never brought into contact with the stationary weight member 69.

In this instance, the weight member 63/64 and the arm member 65/66 as a whole constitute one of the movable weight members.

Fifth Embodiment

Figure 13:
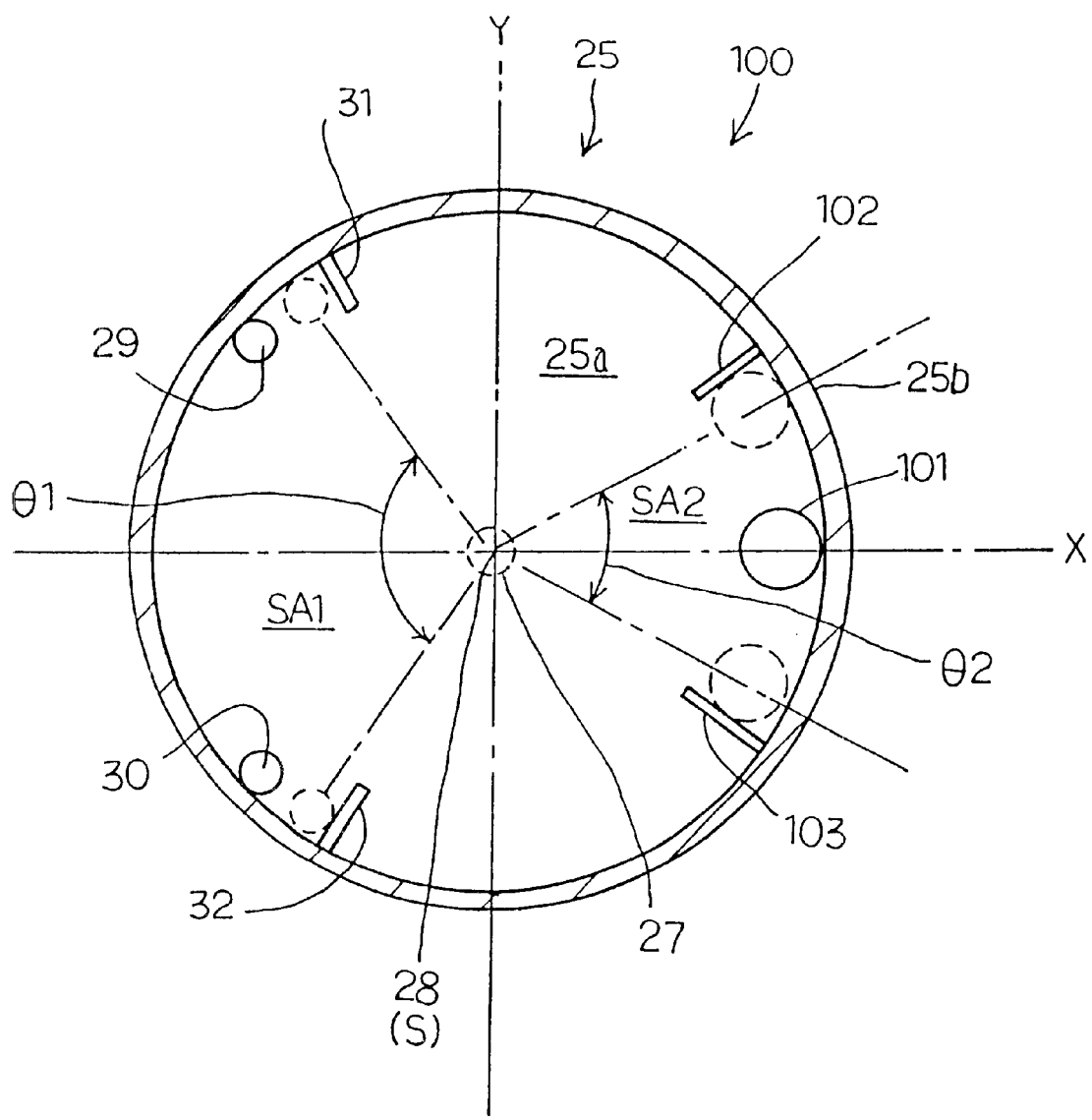
FIG. 13 is a plan view showing another automatic balancing mechanism according to the present invention.

FIG. 13 illustrates another automatic balancing mechanism 100 embodying the present invention. The automatic balancing mechanism 100 is associated with the disk driving mechanism 22, and is similar to the automatic balancing mechanism 21 except for a ball 101 and associated stoppers 102/103. For this reason, the other component members are labeled with the same references as the corresponding component members of the automatic balancing mechanism 21 without detailed description. In the following description, the assembly 24/25/26/27 and the ball 101 as a whole constitute an eccentric rotor EC.

The stoppers 31/32 and the center line 28 define a sectoral area SA1, and the sectoral area SA1 has a central angle θ 1. The balls 29/30 are movable within the sectoral area SA1 along the side wall portion 25b during the rotation of the turn table 25. The stopper 102/103 and the center line 28 also define a sectoral area SA2, and the sectoral area SA2 has a central angle θ 2. The ball 101 is movable within the sectoral area SA2 during the rotation of the turn table 25, and the ball 101 offsets the center of gravity of the eccentric rotor from the center line 28. Thus, the weight member 33 is replaced with the ball 101 in the fifth embodiment.

Figure 14:
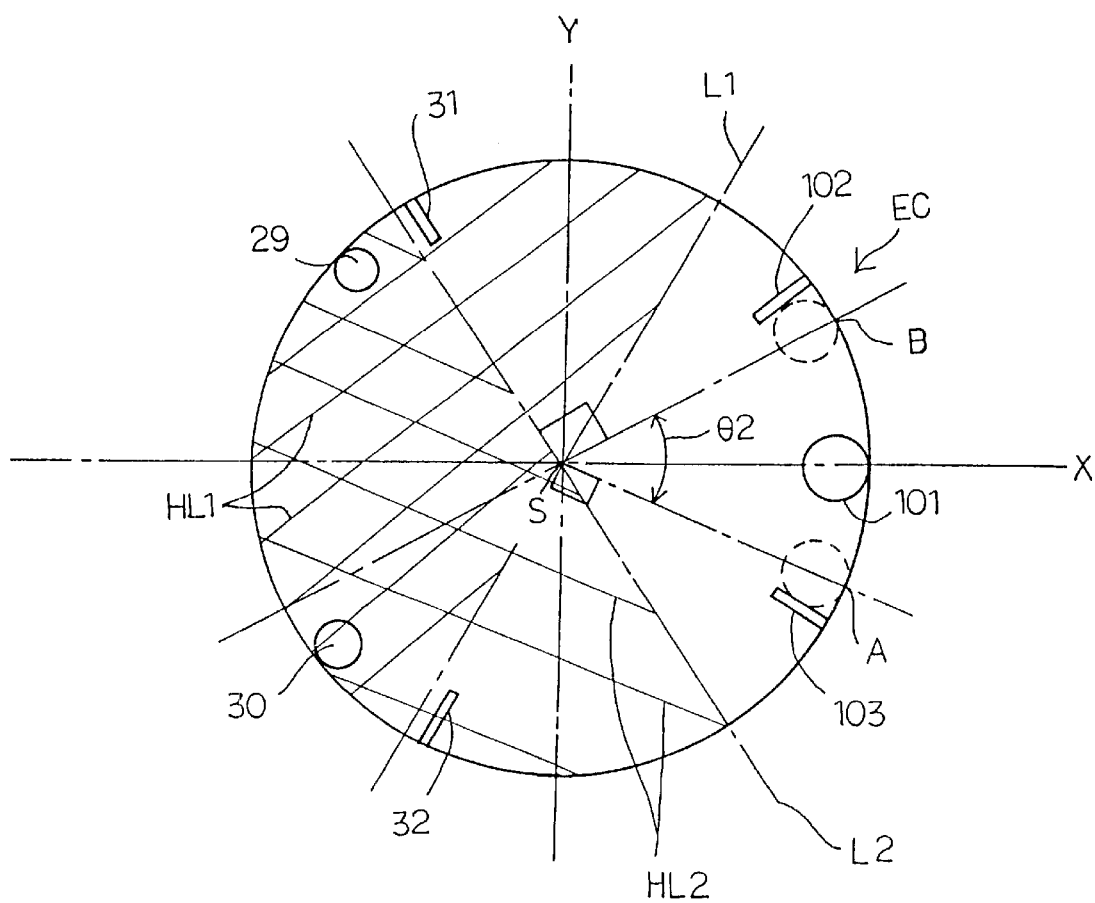
FIG. 14 is a view showing movable ranges of two pairs of balls incorporated in the automatic balancing mechanism shown in FIG. 13.

The sectoral area SA1 is in opposing relation to the sectoral area SA2 with respect to Y-axis, and the center angle θ 1 is larger than the center angle θ 2. Description is made on the center angles θ 1 and θ 2 with reference to FIG. 14. "S" stands for a center of the pulley 25, and is aligned with the center line 28.

The ball 101 is assumed to be held in contact with the stopper 103 at point A. The center of the ball 101 is aligned with line SA drawn from the center S to the point A, and line L1 is perpendicular to line SA. Line L1 divides the bottom area into a left sub-area and a right sub-area. The balls 29/30 are positioned on the left area, and the ball 101 is in the right area. The left area is indicated by hatching lines HL1.

On the other hand, the ball 101 is assumed to be held in contact with the other stopper 102 at point B. Line SB is drawn from the center S to the point B, and line L2 is perpendicular to line SB. In this situation, the balls 29/30 are on the opposite side to the ball 101 with respect to line L2, and the area assigned to the balls 29/30 is indicated by hatching lines HL2.

When the stoppers 102/103 are determined for the ball 101, the balls 29/30 should be moved in the area indicated by both hatching lines HL1 and HL2, and the stoppers 29 and 30 are located at both end lines of the area indicated by the hatching lines HL1/HL2.

In operation, the ball 101 is moved in the area indicated by the center angle θ 2, and causes the balls 29/30 to be on the opposite side to the center of gravity of the eccentric rotor EC. The automatic balancing mechanism achieves all the advantages of the above-described embodiments. The movable weight member 101 is desirable rather than the stationary weight member 33. Although the stationary weight member 33 changes the position of the center of gravity by changing the weight only, the movable weight member 101 can change the position of the center of gravity by changing not only the combination of movable weight members 29/30 and 101 but also the configuration of the weight member 101, and the automatic balancing mechanism can cope with various kinds of unbalance.

Sixth Embodiment

Figure 15:
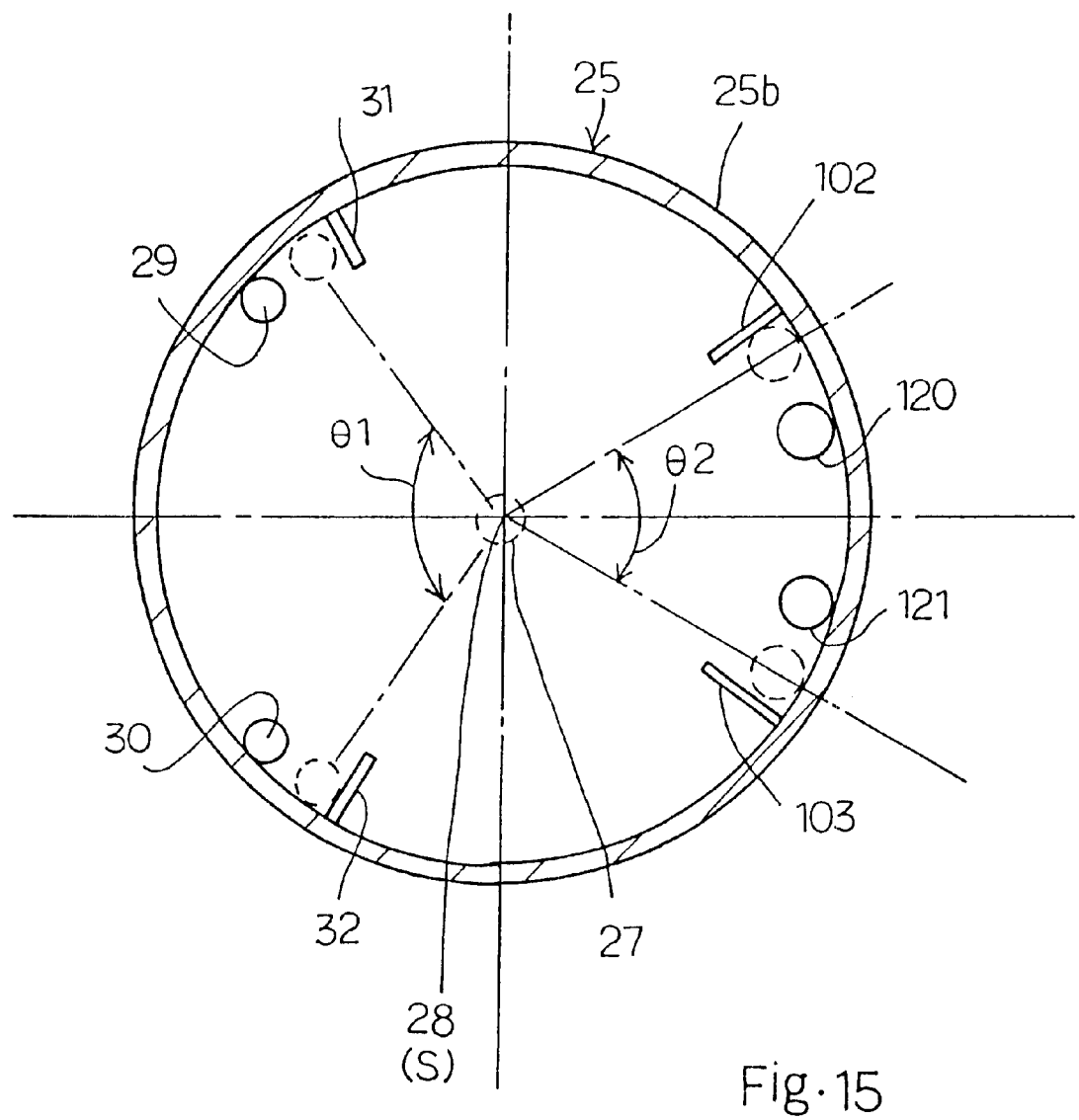
FIG. 15 is a plan view showing another automatic balancing mechanism according to the present invention.
Figure 16:
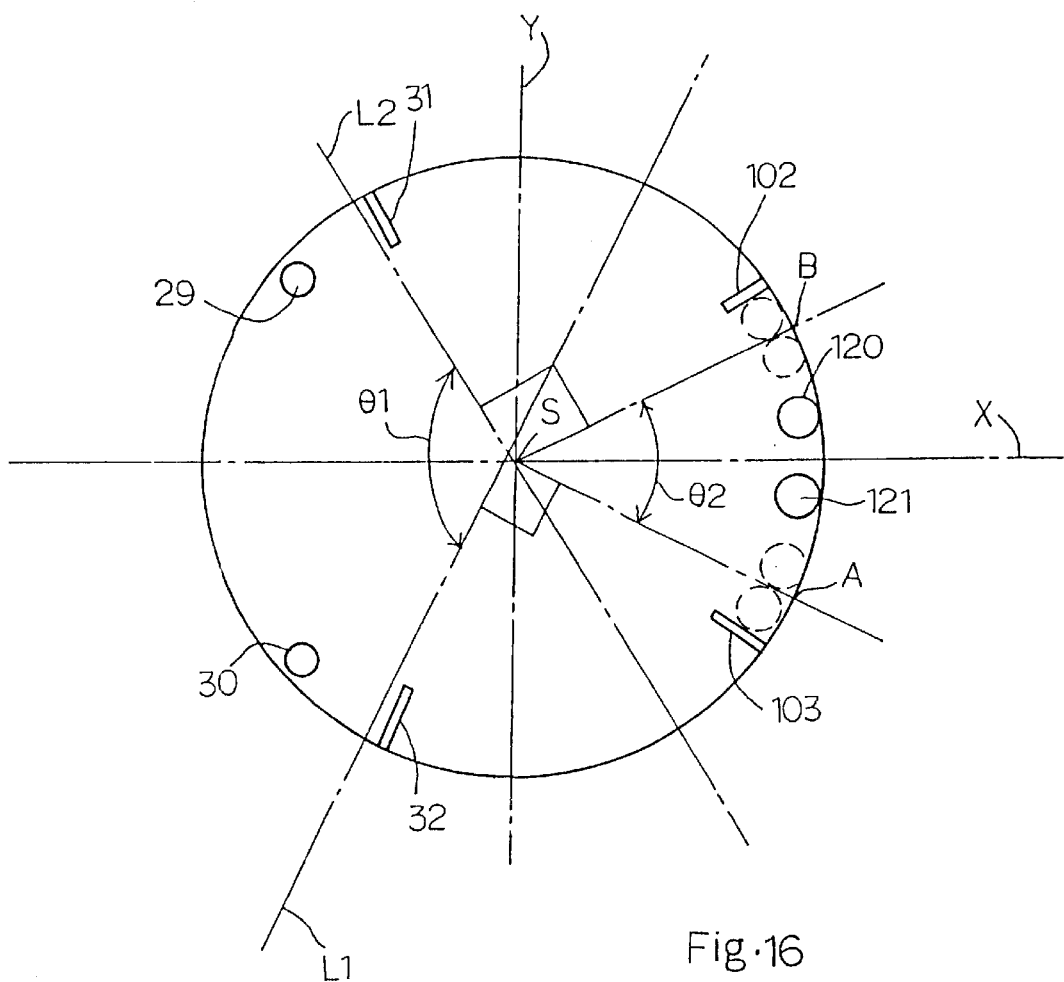
FIG. 16 is a view showing movable ranges of two pairs of balls incorporated in the automatic balancing mechanism shown in FIG. 15.

In the sixth embodiment, the ball 101 is replaced with two balls 120/121 as shown in FIG. 15, and the other components are labeled with the corresponding components of the fifth embodiment. The center angles θ 1 and θ 2 are determined in a similar manner to the fifth embodiment, and the method is illustrated in FIG. 16. When the balls 120/121 reach the limit defined by the stopper 103, line SA is drawn from the center S to the contact point A between the balls 120/121. Similarly, when the balls 120/121 reach the limit defined by the other stopper 102, line SB is drawn from the center S to the contact point B between the balls 120/121. The center angle between line SA and line SB is angle θ 2. L1 and L2 are perpendicular lines to lines SA and SB, and define angle θ 1.

In this instance, two balls 120/121 offset the center of gravity of the eccentric rotor EC. However, the ball 101 may be replaced with more than two balls, and both of the ball 101 and the weight member 33 may be used for the automatic balancing mechanism.

When the ball or balls are used in the automatic balancing mechanism, there is more than one balancing condition. For this reason, the ball/balls are liable to be unstably moved in the sectoral area assigned thereto due to the weight, run-out of the center axis 28 or disturbance. In order to make the weight member/weight members stable, it is recommendable to change the response characteristic of the movable weight member/members. If the manufacturer gives appropriate configuration such as the spherical configuration or the column configuration to the movable weight member/members, the response characteristic is changed. The movable weight member with the spherical configuration is moved through a rolling motion, and the movable weight member with the column configuration is moved through a sliding motion.

The movable weight members 120/121 are desirable rather than the stationary weight member 33. Although the stationary weight member 33 changes the position of the center of gravity by changing the weight only, the movable weight members 120/121 can change the position of the center of gravity by changing not only the combination of movable weight members 29/30 and 101 but also the configuration of the weight member 101, and the automatic balancing mechanism can cope with various kinds of unbalance.

Figure 3B:
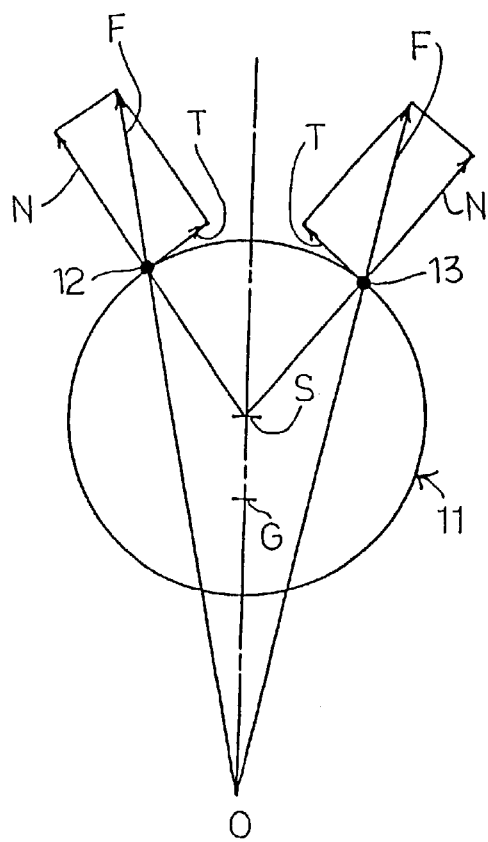

As will be appreciated from the foregoing description, the first weight—means and the stopper means locate the center of gravity of the rotor in the opposite side to the plurality of second weight means. As a result, the automatic balancing mechanism is operative in the relative relation shown in FIG. 3B at all times, and is free from vibrations due to the characteristic angular velocity.

Although particular embodiments of the present invention have been shown and described, it will be obvious to those skilled in the art that various changes and modifications may be made without departing from the spirit and scope of the present invention.

Figure 17A:
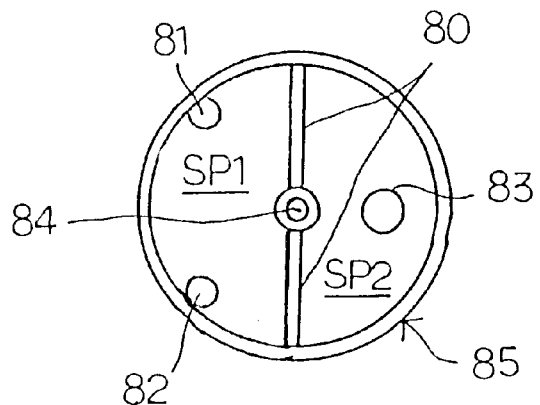
FIGS. 17A to 17C are plane views showing a modification of the stopper incorporated in the automatic balancing mechanism.
Figure 17B:
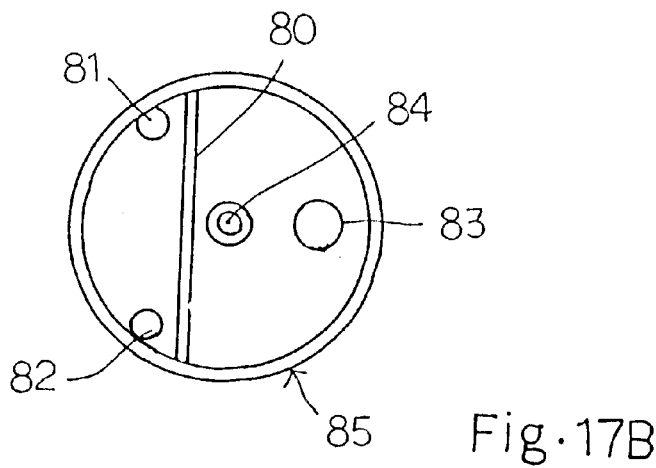
Figure 17C:
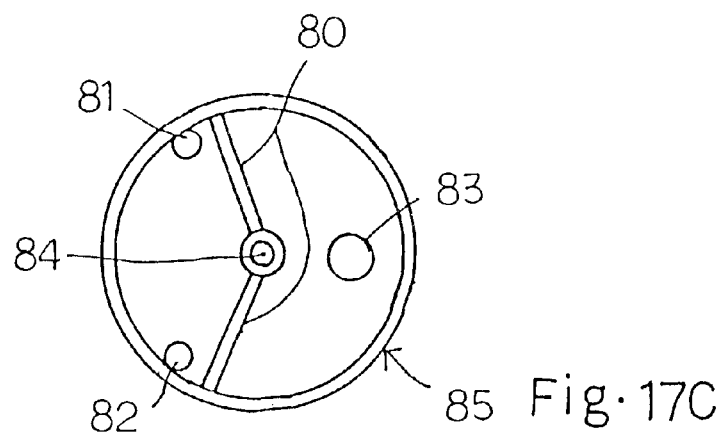

For example, the stopper may be implemented by a plate member 80 as shown in FIGS. 17A to 17C. In FIG. 17A, the plate member 80 is split into two sub-plate members, and balls 81/82 are movably provided in a sectoral space SP1 opposite to another sectoral space SP2 assigned to a stationary weight member 83. The plate member 80 may be offset from the center line 84 of a rotor 85 as shown in FIG. 17B. The angle between the sub-plate members may be variable as shown in FIG. 17C.

More than two balls may be incorporated in the automatic balancing mechanism, and are one of the multiples of "2". The configuration of movable weights is never limited to sphere. Small disk members may be used as the movable weight members, and are slidable around the center axis 28.

Means for pressing the disk 26 against the turn table 24 is not limited to the pulley in so far as the disk 26 becomes integral with the turn table 24.

Figure 18:
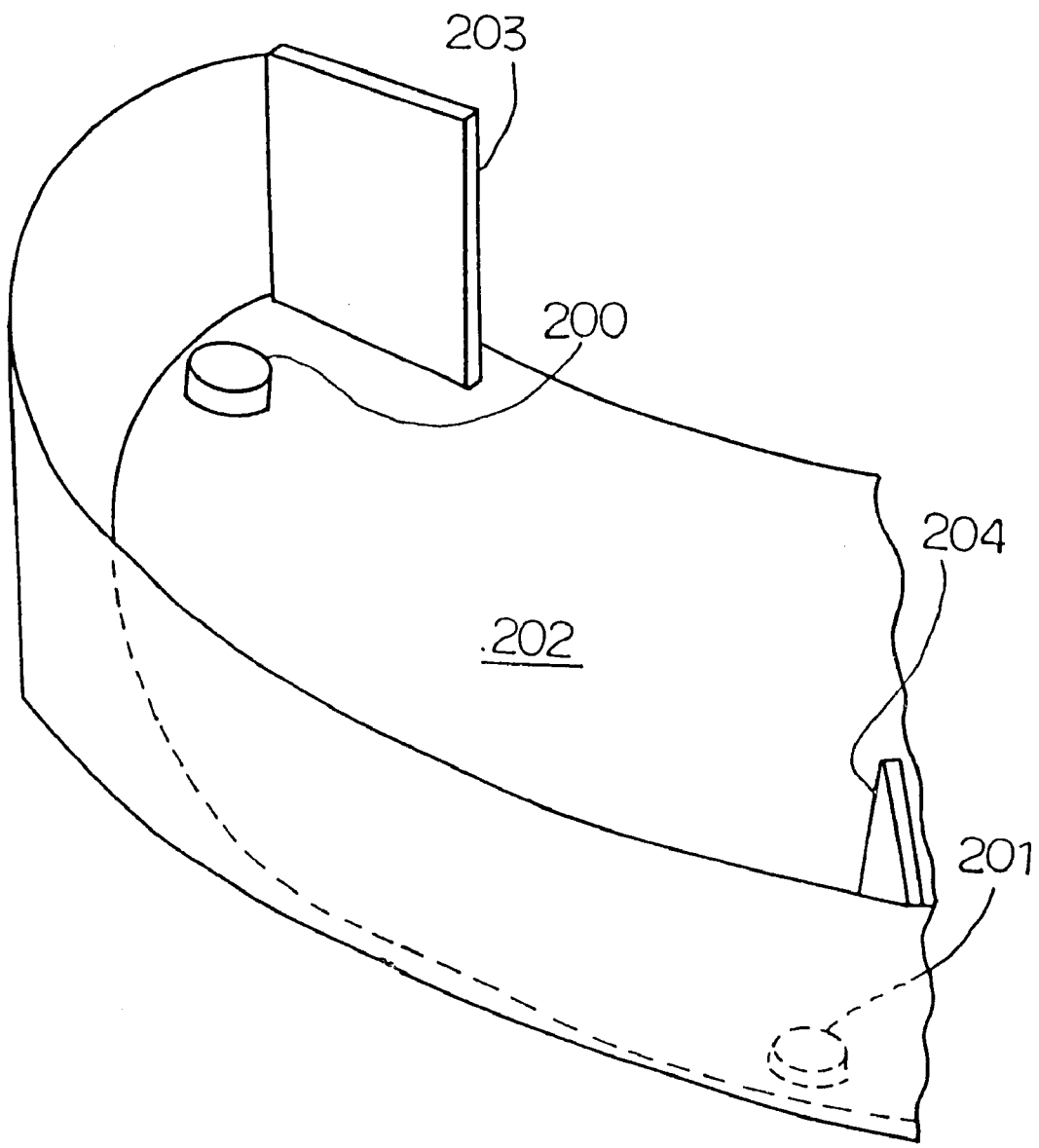
FIG. 18 is a perspective view showing a modification of movable weight members.

Small disk plates 200/201 may serve as the movable weight means. The small disk plates 200/201 are slidable on a bottom plate 202 between stopper plates 203 and 204 as shown in FIG. 18. The ball 101 or balls 120/121 may be replaced with a small disk plate or plates.

Figure 19:
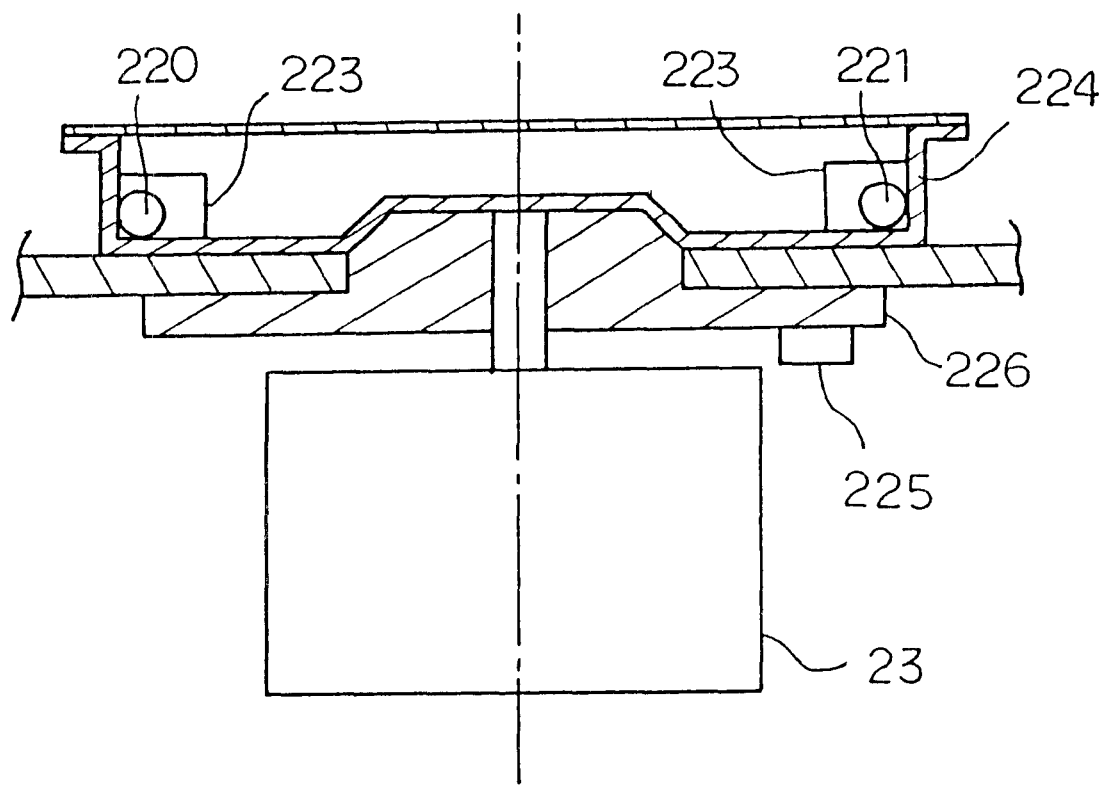
FIG. 19 is a cross sectional view showing a modification of the automatic balancing mechanism shown in FIG. 4.

The stationary weight member may be attached to a component of the rotor different from a component where the balls and the stoppers are provided. In other words, the stationary weight member is attached to one of the pulley, the turn table and the armature, and the balls and the stoppers are provided in another of the three component parts of the rotor. For example, the balls 220/221 and the stoppers 223 are provided in the pulley 224, and the weight member 225 is attached to the turn table 226 as shown in FIG. 19.

The automatic balancing mechanism according to the present invention is applicable to any rotating machine such as a compact disk driver, a turbine or a fan/blower.

What is claimed is:

1. An automatic balancing mechanism for a disk drive, the automatic balancing mechanism comprising:

at least two first movable weight members movably disposed within a first predetermined angular range along a periphery of a rotor, each of the at least two first movable weight members being free to move throughout the entirety of the first predetermined angular range, at least one second movable weight member disposed in such a manner as to be movable within a second predetermined angular range opposite to said first predetermined angular range with respect to a rotational axis, and means for defining said first predetermined angular range and said second predetermined angular range.

2. An automatic balancing mechanism associated with a rotor driven for rotation around a rotating axis, comprising:

a first weight means positioned on said rotor so as to make a center of gravity offset from said rotating axis of said rotor, said first weight means being movable with respect to said rotor;

a stopper means stationary with respect to said rotor, and defining a first moving path entirely on the opposite side to said first weight means and said center of gravity with respect to a virtual line perpendicular to said rotating axis; and a plurality of second weight means equal in number to a multiple of two, the plurality of second weight means being confined within said first moving path and movable to respective balancing positions within said first moving path due to centrifugal force exerted thereon during a rotation of said rotor so as to cancel unbalance due to said center of gravity.

3. The automatic balancing mechanism as set forth in claim 2, in which said first weight means is implemented by a single ball moved along a second moving path provided on the opposite side of said first moving path with respect to said virtual line due to said centrifugal force.

4. The automatic balancing mechanism as set forth in claim 2, in which said first weight means is implemented by a plurality of weight sub-means independently moved along a second moving path provided on the opposite side of said first moving path with respect to said virtual line due to said centrifugal force.

5. The automatic balancing mechanism as set forth in claim 4, in which said plurality of weight sub-means are balls.

* * * * *